F. A. & H. B. PICKETT.
CHEMICAL TREATING MANURE MIXER, PULVERIZER, AND DISTRIBUTER.
APPLICATION FILED MAR. 27, 1915.
1,173,856.
Patented Feb. 29, 1916.
2 SHEETS—SHEET 1.
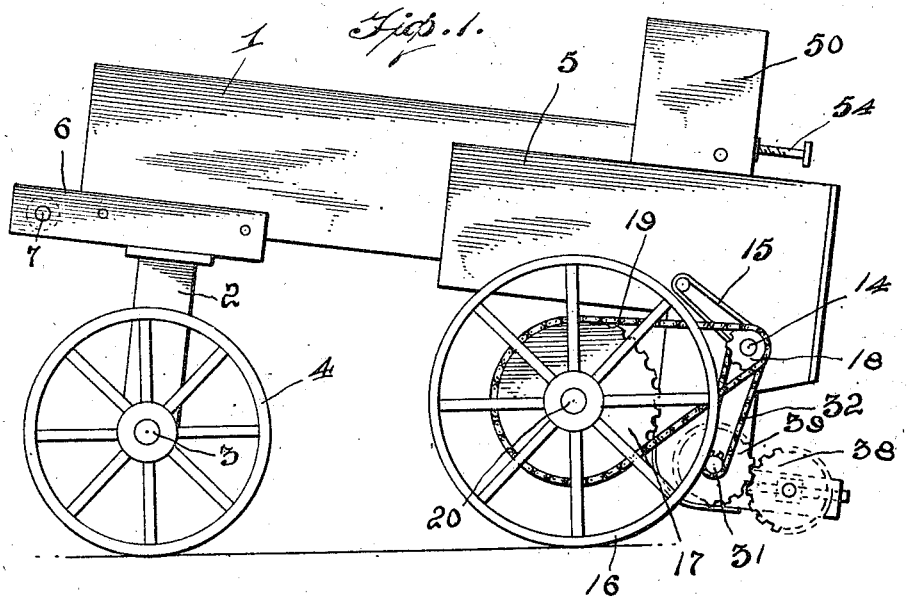
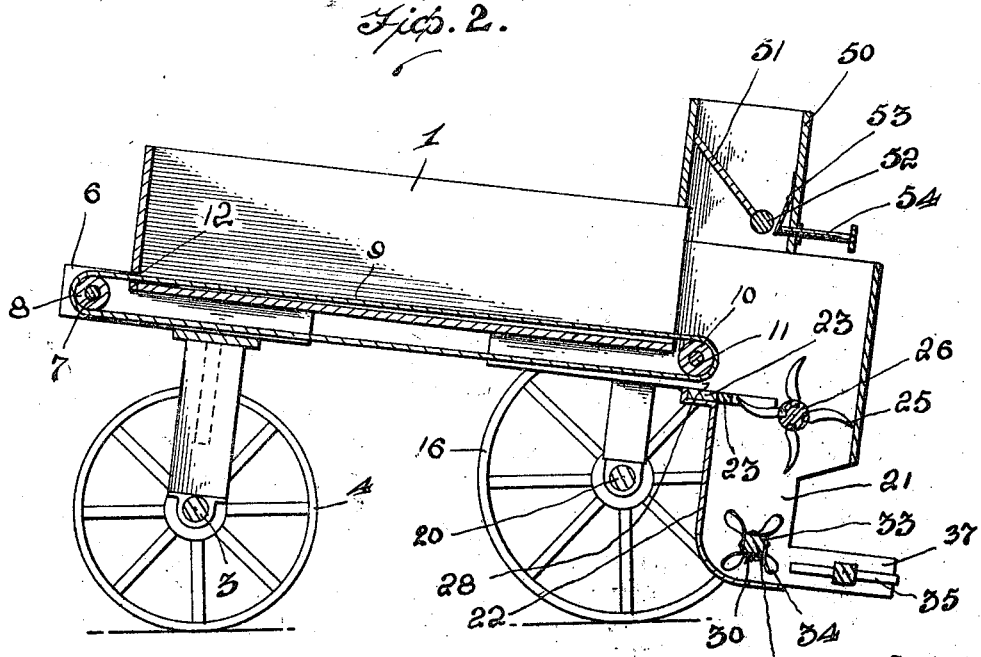
Witnesses
Inventors
F. A. Pickett.
H. B. Pickett.

F. A. & H. B. PICKETT.
CHEMICAL TREATING MANURE MIXER, PULVERIZER, AND DISTRIBUTER.
APPLICATION FILED MAR. 27, 1915.
1,173,856.
Patented Feb. 29, 1916.
2 SHEETS—SHEET 2.
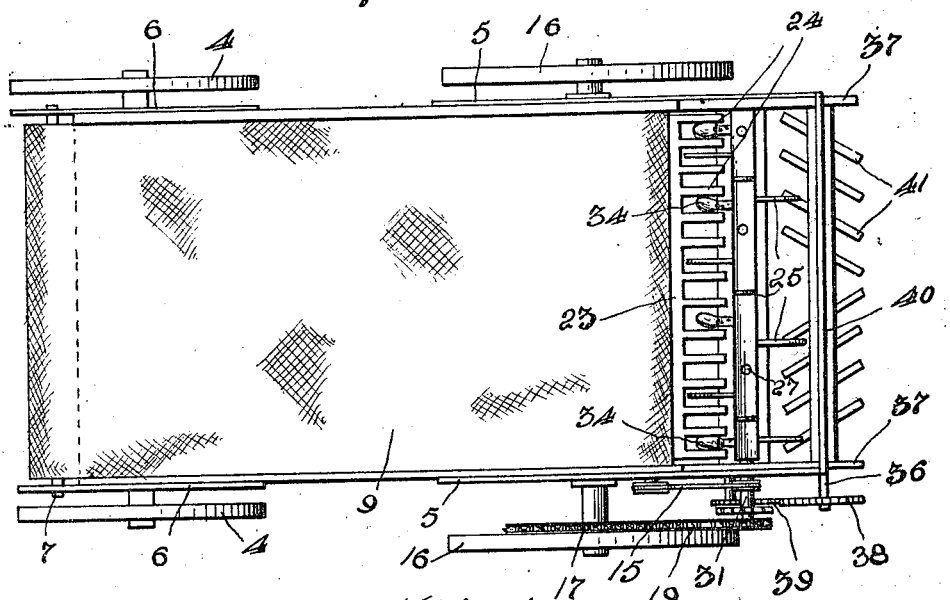
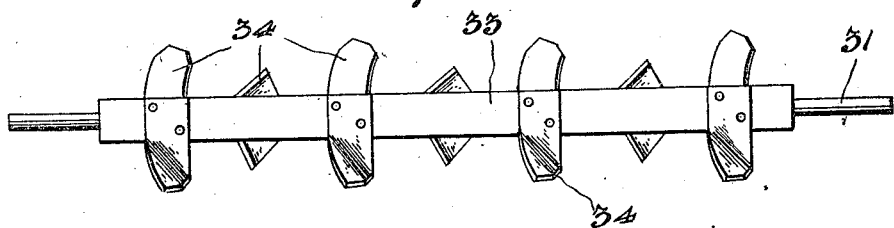
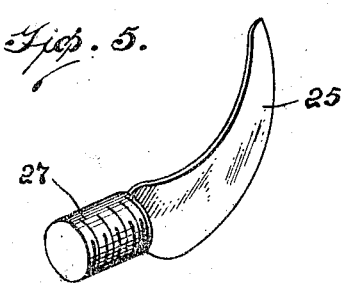
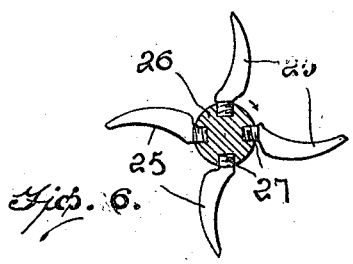
Inventors
F. A. Pickett.
H. B. Pickett.

UNITED STATES PATENT OFFICE.

FREDERICK A. PICKETT AND HURDIE B. PICKETT, OF BALTIMORE, MARYLAND.

CHEMICAL-TREATING MANURE MIXER, PULVERIZER, AND DISTRIBUTER.

1,173,856.  Specification of Letters Patent.  Patented Feb. 29, 1916.

Application filed March 27, 1915.  Serial No. 17,440.

*To all whom it may concern:*

Be it known that we, FREDERICK A. PICKETT and HURDIE B. PICKETT, citizens of the United States, residing at Baltimore, in the State of Maryland, have invented certain new and useful Improvements in Chemical-Treating Manure Mixers, Pulverizers, and Distributers; and we do hereby declare the following to be a full, clear, and exact description of the invention, such as will enable others skilled in the art to which it appertains to make and use the same.

This invention relates to a device for chemically treating farm or stable manure, peat, deteriorated straw, hay or other analogous fertilizing material and evenly distributing the same over the ground to be fertilized.

The primary object of this invention is to provide a manure mixer, fertilizer and distributer which includes means for chemically treating the manure prior to distribution upon a field, for increasing the fertilizing proclivities of manure to render the same highly efficient for increasing the strength and growth of various types of agricultural products, and to provide means for cutting or shredding the manure for insuring its proper distribution over a field.

Another object of this invention is to provide means for regulating the quantity of chemicals applied to the manure and also to provide means for distributing the manure in both directions laterally from the rear end of the spreader.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a side elevation of the improved manure mixer, pulverizer and distributer, Fig. 2 is a longitudinal section through the device, Fig. 3 is a top plan view, Fig. 4 is a detail view of part of the distributing mechanism, Fig. 5 is a perspective view of one of the cutting knives, and Fig. 6 is a cross sectional view through the cutting or shredding structure.

Referring more particularly to the drawings, 1 designates a manure retaining body of the device, which is constructed in a manner similar to the bed of the ordinary type of manure spreader, having front trucks 2 suspended beneath its forward end which support an axle 3, upon the outer spindle ends of which are mounted an ordinary type of supporting wheels 4. The bed 1 has auxiliary sides 5 secured to the outer surfaces of the sides of the same at the rear ends thereof, which auxiliary side boards extend downwardly from the bottom of the wagon bed, as is clearly shown in Figs. 1 and 2 of the drawings. Forwardly extending brace arms 6 are secured to the forward ends of the sides of the bed 1 and project forwardly from the front end of the bed, forming supports for rotatably supporting a shaft 7 upon which a roller 8 is mounted. A flexible conveyer 9 travels about the roller 8 and about a roller 10, which is mounted upon a shaft 11. The shaft 11 is rotatably carried by the depending sections of the auxiliary sides 5, so that the upper surface of the conveyer 9 will travel a short distance above the bottom of the bed 1, and the lower section of the conveyer will travel beneath the bottom of the bed, as is clearly shown in Fig. 2. The conveyer passes through an opening 12, which is formed in the forward end of the bed 1. The shaft 11 is operatively connected to a shaft 14, by means of any suitable type of power transmitting mechanism, illustrated at 15. The shaft 14 is rotatable by the rotation of the rear traction wheels 16 of the device, through the medium of sprockets 17 and 18 and the sprocket chain 19. The rear wheels 16 are mounted upon the rear axle 20 of the ordinary construction, and the sprocket 17 is attached to one of the wheels for synchronous rotation therewith.

The auxiliary sides 5 have depending sections 21 formed thereupon, the forward edges of which have a plate 22 secured thereto for forming the front end of a housing which has the rear side of its lower end open to permit the distribution of fertilizer therefrom.

The upper end of the plate 22 is secured to a cross bar 23, which has a plurality of rearwardly extending teeth 24 formed thereon at spaced intervals along its length, between which teeth the cutting or shredding knives 25 pass. The cutting or shredding knives 25 are carried by the sleeve 26 which is mounted upon the shaft 14. The knives 25 have externally screw threaded shanks or plugs 27 formed upon their inner or blunt ends, which are detachably seated in internally screw threaded openings formed in the sleeve 26 for permitting of the removal of the knives. The knives 25 have their cutting edges convexly curved, so that in case stones, tin cans, or other foreign articles might be passed downwardly upon the teeth 24, in the manure, the knives will engage the foreign articles and force them upwardly through an opening 28 formed between the bottom of the bed 1 and the upper surface of the bar 23. The knives 25 will engage the manure and cut or shred the same as it passes downwardly between the teeth 24. The manure will fall from the shredding knives and teeth upon the rotary distributer 30. The rotary distributer 30 includes a shaft 31, which is rotatably carried by the depending projections 21, and is operatively connected to the shaft 14 by means of sprockets and the sprocket chain, as indicated at 32. The shaft 31 has a rectangular sleeve 33 mounted thereon, which has blades 34 secured to the sides thereof, in staggered relation with respect to each other. The blades 34 are curved in the manner similar to the curvature of propeller blades, so that they engage the manure and throw it rearwardly on a spreader or distributer 35 which is positioned rearwardly of the rotary distributer 30. The rear distributer 35 is composed of a shaft 36 journaled in rearwardly extending arms 37 and operatively connected to the shaft 31 by a gear 38, which meshes with a gear 39 mounted upon the shaft 31. A rectangular sleeve 40 is mounted upon the shaft 36 intermediate the bracket arms 37 and has a plurality of obliquely disposed manure spreading fingers 41 projecting transversely upon opposite sides of the rectangular sleeve. The fingers 41 angle inwardly toward the center of the rectangular sleeve, from each end, as is clearly shown in Fig. 3 of the drawings, so as to alternately throw the fertilizer or manure inwardly toward the center of the track over which the spreader travels and outwardly beyond the edges of the distributer, for efficiently distributing the same over a field.

The auxiliary sides 5 have a hopper 50 mounted upon their upper edges and extending laterally across the top of the bed, which hopper has an inclined bottom or partition 51 formed therein, to the lower edge of which is secured a bar 52, which is circular in cross section. The bar 52 is positioned inwardly of the inner surface of the rear side of the hopper. A resilient plate 53 is secured to the inner surface of the rear side of the hopper and has its lower edge positioned for engagement with or movement toward the bar 52. The distance between the bar 52 and the lower edge of the resilient plate 53 is regulated by the adjustment of the set screw 54, for regulating the width of the opening between the bar and the resilient plate for increasing or decreasing the size of the dispensing opening of the hopper. The space between the bar 52 and the plate 53 is positioned directly above the cutting or shredding knives and the hopper 50 is provided for retaining various types of chemicals, such as nitrate of soda, acid phosphate, potash, or if it is desired, raw phosphate rock, lime or other fertilizing elements in a dry and pulverized state. By the adjustment of the resilient plate 53, any desired quantity of these chemicals or elements may be administered to the stable or other manure for properly treating it to obtain the best results as a fertilizer for various types of agricultural products. The natural condition of the manure is such that a high percentage of moisture is usually contained therein, and the chemicals coming in contact with the manure, and being in a fine or powdered state are either formed into a liquid solution or become moist for adherence to the manure. The manure acts as a base for holding the chemicals in suspension until they are utilized by the growing plants.

The rotation of the shredding or cutting knives will thoroughly mix the chemicals and farm manure and thoroughly shred or substantially pulverize the manure, making a fertilizer of fine condition which may be evenly distributed over the ground, and which will lie flat upon the ground, eliminating to a material extent the waste of the nutritious proclivities of the same by atmospherical action.

From the foregoing description taken in connection with the accompanying drawings the advantages of construction and of the method of operation of the improved chemical treating manure mixer, pulverizer and distributer will be readily apparent to those skilled in the art to which this invention appertains, and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a manure mixer, pulverizer and distributer, the combination, of a manure retaining body, a plurality of shredding knives carried by the rear end of said body, a chemical retaining and distributing construction carried by said body directly above said shredding knives for depositing chemicals upon the manure during shredding, and distributing means positioned beneath said shredding knives for receiving the treated manure from the shredding knives.

2. In a manure mixer, pulverizer and distributer, the combination, of a manure retaining body, a plurality of shredding knives carried by the rear end of said body, and means co-acting with said shredding knives for removing stones or other foreign articles from the manure during shredding.

3. In a manure mixer, pulverizer and distributer, the combination, of a manure retaining bed, pulverizing means carried by the rear end of said bed for cutting or shredding the manure, distributing means carried by said bed beneath said pulverizing means for distributing the fertilizer, a chemical retaining hopper carried by said bed directly above said pulverizing means, and means carried by said hopper for regulating the quantity of chemical distributed from the hopper upon the manure.

4. In a manure mixer, pulverizer and distributer, the combination, of a manure retaining body, a plurality of shredding knives carried by the rear end of said body, means co-acting with said shredding knives for removing stones or other foreign articles from the manure during shredding, and a chemical retaining and distributing construction carried by said body directly above said shredding knives for depositing chemicals upon the manure during shredding.

5. In a manure mixer, pulverizer and distributer, the combination, of a manure retaining bed, a manure pulverizing means carried by the rear end of said bed, means for feeding the manure to said pulverizing means, means for depositing chemicals upon said manure while being shredded, said shredding efficiently mixing the chemicals and the manure, and distributing means positioned beneath said shredding means for distributing the treated manure over a field.

6. In a manure mixer, pulverizer and distributer, the combination, of a manure retaining body, a plurality of shredding knives carried by the rear end of said body, means co-acting with said shredding knives for removing stones or other foreign articles from the manure during shredding, a chemical retaining and distributing construction carried by said body directly above said shredding knives for depositing chemicals upon the manure during shredding, and distributing means positioned beneath said shredding knives for receiving the treated manure from the shredding knives.

7. In a manure mixer, pulverizer and distributer, a manure retaining bed, a projection formed upon the rear end of said bed, a plurality of rearwardly extending spaced teeth carried by said projection, a shaft rotatably carried by said projection, a plurality of radially extending shredding knives carried by said shaft for passage between said teeth for shredding manure, said projection being provided with an opening formed above said teeth, said shredding knives having their cutting surfaces convexly curved for forcing foreign articles outwardly through said opening.

8. In a manure mixer, pulverizer and distributer, a manure retaining bed, a projection formed upon the rear end of said bed, a plurality of rearwardly extending spaced teeth carried by said projection, a shaft rotatably carried by said projection, a plurality of radially extending shredding knives carried by said shaft for passage between said teeth for shredding manure, a chemical retaining hopper carried by said a chemical retaining hopper carried by said manure retaining bed and having its outlet positioned directly above said teeth, means for regulating the scope of said hopper outlet for regulating the quantity of chemicals deposited upon said fertilizer.

9. In a manure mixer, pulverizer, and distributer, a manure retaining bed, a projection formed upon the rear end of said bed, a plurality of rearwardly extending spaced teeth carried by said projection, a shaft rotatably carried by said projection, a plurality of radially extending shredding knives carried by said shaft for passage between said teeth for shredding manure, a chemical retaining hopper carried by said manure retaining bed and having its outlet positioned directly above said teeth, means for regulating the scope of said hopper outlet for regulating the quantity of chemicals deposited upon said fertilizer, and distributing means carried by said projection beneath said teeth and said shredding knives for receiving the fertilizer from said shredding knives and distributing it rearwardly of said bed.

10. In a manure mixer, pulverizer and distributer, a manure retaining bed, a projection formed upon the rear end of said bed, a plurality of rearwardly extending spaced teeth carried by said projection, a shaft rotatably carried by said projection, a plurality of radially extending shredding knives carried by said shaft for passage between said teeth for shredding manure, said projection being provided with an opening formed above said teeth, said shredding knives having their cutting surfaces convexly curved for forcing foreign articles outwardly through said opening, a chemical retaining hopper carried by said manure retaining bed and having its outlet positioned directly above said teeth, means for regulating the scope of said hopper outlet for regulating the quantity of chemicals deposited upon said fertilizer.

11. In a manure mixer, pulverizer and distributer, a manure retaining bed, a projection formed upon the rear end of said bed, a plurality of rearwardly extending spaced teeth carried by said projection, a shaft rotatably carried by said projection, a plurality of radially extending shredding knives carried by said shaft for passage between said teeth for shredding manure, said projection being provided with an opening formed above said teeth, said shredding knives having the cutting surfaces convexly curved for forcing foreign articles outwardly through said opening, a chemical retaining hopper carried by said manure retaining bed and having its outlet positioned directly above said teeth, means for regulating the scope of said hopper outlet for regulating the quantity of chemicals deposited upon said fertilizer, and distributing means carried by said projection beneath said teeth and said shredding knives for receiving the fertilizer from said shredding knives and distributing it rearwardly of said bed.

12. In a manure mixer, pulverizer and distributer, a manure retaining bed, projections formed upon the rear end of said bed, a plurality of rearwardly extending substantially horizontally disposed spaced teeth carried by said projections, a shaft rotatably carried by said projections, a plurality of radially extending shredding knives detachably carried by said shaft for passage between said teeth for shredding or pulverizing manure, a conveyer carried by said retaining bed for feeding manure to said teeth and knives, a shaft rotatably positioned beneath said teeth, a plurality of staggeredly disposed spreading blades carried by said shaft, a shaft rotatably supported rearwardly of said distributing shaft, said last named shaft having a plurality of obliquely disposed fingers extending radially therefrom, said fingers angled inwardly toward the center of said shaft from each end thereof upon one side of the shaft and angled toward the ends of the shaft upon the other side.

13. In a manure mixer, pulverizer and distributer, a manure retaining bed, projections formed upon the rear end of said bed, a plurality of rearwardly extending substantially horizontally disposed spaced teeth carried by said projections, a shaft rotatably carried by said projections, a plurality of radially extending shredding knives detachably carried by said shaft for passage between said teeth for shredding or pulverizing manure, a conveyer carried by said retaining bed for feeding manure to said teeth and knives, a shaft rotatably positioned beneath said teeth, a plurality of staggeredly disposed spreading blades carried by said shaft, a shaft rotatably supported rearwardly of said distributing shaft, said last named shaft having a plurality of obliquely disposed fingers extending radially therefrom, said fingers angled inwardly toward the center of said shaft from each end thereof upon one side of the shaft and angled toward the ends of the shaft upon the other side, a chemical retaining hopper carried by said bed and having its outlet positioned directly above said teeth, and means for regulating the scope of said outlet for increasing or decreasing the quantity of chemicals deposited upon manure while being shredded.

14. In a manure mixer, pulverizer and distributer, the combination, of a manure retaining bed, manure shredding means carried by the rear end of said bed and including a plurality of shredding knives having their cutting edges convexly curved, means operable by the travel of the manure mixer for feeding manure to said shredding means, and a chemical retaining and distributing construction carried by said body directly above said shredding knives for depositing chemicals upon the manure during shredding.

15. In a manure mixer, pulverizer and distributer, the combination, of a manure retaining bed, manure shredding means carried by the rear ends of said bed and including a plurality of shredding knives, said shredding knives having their cutting edges convexly curved, means co-acting with said shredding knives for removing stones or other foreign articles from the manure during shredding, and means operable by the travel of the manure mixer, for feeding manure to said shredding means.

16. In a manure mixer, pulverizer and distributer, the combination, of a manure retaining bed, manure shredding means carried by the rear end of said bed and including a plurality of shredding knives, said shredding knives having their cutting edges convexly curved, means co-acting with said shredding knives for removing stones or other foreign articles from the manure during shredding, means operable by the travel of the manure mixer for feeding manure to said shredding means, a chemical retaining and distributing construction carried by said body directly above said shredding knives for depositing chemicals upon the manure during shredding, and distributing means positioned beneath said shredding knives for receiving the treated manure from the shredding knives.

In testimony whereof we affix our signatures in presence of two witnesses.

FREDERICK A. PICKETT.
HURDIE B. PICKETT.

Witnesses:
WM. C. RIGOR,
PAUL T. NEUS.